United States Patent
Huang et al.

(10) Patent No.: US 11,284,173 B2
(45) Date of Patent: Mar. 22, 2022

(54) NETWORK SENSING TOPOLOGIES FOR FIBER OPTIC SENSING

(71) Applicant: NEC Laboratories America, Inc., Princeton, NJ (US)

(72) Inventors: Ming-Fang Huang, Princeton, NJ (US); Ting Wang, West Windsor, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 17/221,820

(22) Filed: Apr. 4, 2021

(65) Prior Publication Data

US 2021/0314681 A1    Oct. 7, 2021

Related U.S. Application Data

(60) Provisional application No. 63/070,457, filed on Aug. 26, 2020, provisional application No. 63/006,233, filed on Apr. 7, 2020.

(51) Int. Cl.
*H04Q 11/00* (2006.01)
*G01H 9/00* (2006.01)

(52) U.S. Cl.
CPC ... *H04Q 11/0062* (2013.01); *H04Q 2011/009* (2013.01)

(58) Field of Classification Search
CPC .......................... H04Q 11/0062; G01H 9/004
See application file for complete search history.

(56) References Cited

U.S. PATENT DOCUMENTS

2019/0197846 A1\* 6/2019 Englund .............. H04R 23/008
2019/0379951 A1\* 12/2019 Yuang ................ H04Q 11/0003

\* cited by examiner

*Primary Examiner* — Shi K Li
(74) *Attorney, Agent, or Firm* — Joseph Kolodka (57) ABSTRACT

Aspects of the present disclosure describe distributed fiber optic sensing (DFOS) systems, methods, and structures that advantageously utilize existing telecommunications facilities that serve as not only to convey telecommunications traffic—but as a sensor medium providing useful sensory information. In sharp contrast to the prior art—a DFOS system when so deployed may advantageously exploit network topologies and optical switches to provide novel sensing features including the detection of environmental events including acoustic, temperature, and vibrational events that may be indicative of societal activity including traffic and/or emergency events.

5 Claims, 15 Drawing Sheets

NETWORK SENSING TOPOLOGIES FOR FIBER OPTIC SENSING

CROSS REFERENCE

This disclosure claims the benefit of U.S. Provisional Patent Application Ser. No. 63/006,233 filed 7 Apr. 2020 and U.S. Provisional Patent Application Ser. No. 63/070,457 FILED 26 Aug. 2020, the entire contents of each is incorporated by reference as if set forth at length herein.

TECHNICAL FIELD

This disclosure relates generally to distributed fiber optic sensing (DFOS) applications and more particularly to DFOS network topologies that may advantageously be constructed from existing optical telecommunications facilities.

BACKGROUND

As is known, telecommunications carriers have constructed optical fiber infrastructures to support exploding quantities of telecommunications traffic that have become essential to contemporary life. Until most recently however, such infrastructures have been utilized to provide a single function—namely—data transmission and communications.

SUMMARY

An advance in the art is made according to aspects of the present disclosure directed to distributed fiber optic sensing systems (DFOS), methods, and structures that advantageously utilize existing telecommunications facilities. According to aspects of the present disclosure, such facilities serve as not only to convey telecommunications traffic—but as a sensor medium providing useful sensory information.

According to aspects of the present disclosure—and in sharp contrast to the prior art—a DFOS system when so deployed may advantageously exploit network topologies and optical switches to provide novel sensing features including the detection of environmental events including acoustic, temperature, and vibrational events that may be indicative of societal activity including traffic and/or emergency events.

BRIEF DESCRIPTION OF THE DRAWING

A more complete understanding of the present disclosure may be realized by reference to the accompanying drawing in which:

FIG. 3(A) and FIG. 3(B) are schematic diagrams showing an illustrative star network topology for: FIG. 3(A)—distributed temperature sensing (DTS); and FIG. 3(B)—distributed vibration sensing (DVS) according to aspects of the present disclosure;

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that distributed fiber optic sensing (DFOS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

As we shall show and describe—systems, methods, and structures according to aspects of the present disclosure employs a DVS (Distributed Vibration Sensor) or DAS (Distributed Acoustic Sensor) interrogator to recover a vibration occurring anywhere along a sensing fiber in equivalent sampling frequency of the pulse repetition rate. For example, for a DVS or DAS that uses pulses of 20 kHz repetition rate, the vibration at the point of interest will be sampled at 20 kHz frequency which—as those skilled in the art will understand and appreciate—is able to cover frequency of up to 10 kHz according to Nyquist rule. In addition, other sensors in communication with the DFOS may advantageously provide the monitoring of gas molecules as well.

With respect to the present disclosure, we describe systems, methods, structures (solutions) that advantageously produce continuous, real-time traffic information along an entire roadway using existing, deployed, regular grade communication optical fiber (fiber optic cable) via distributed fiber optic sensing (DFOS)—that may include distributed vibration sensing (DAS) and/or distributed vibration sensing (DVS).

Figure 1A:
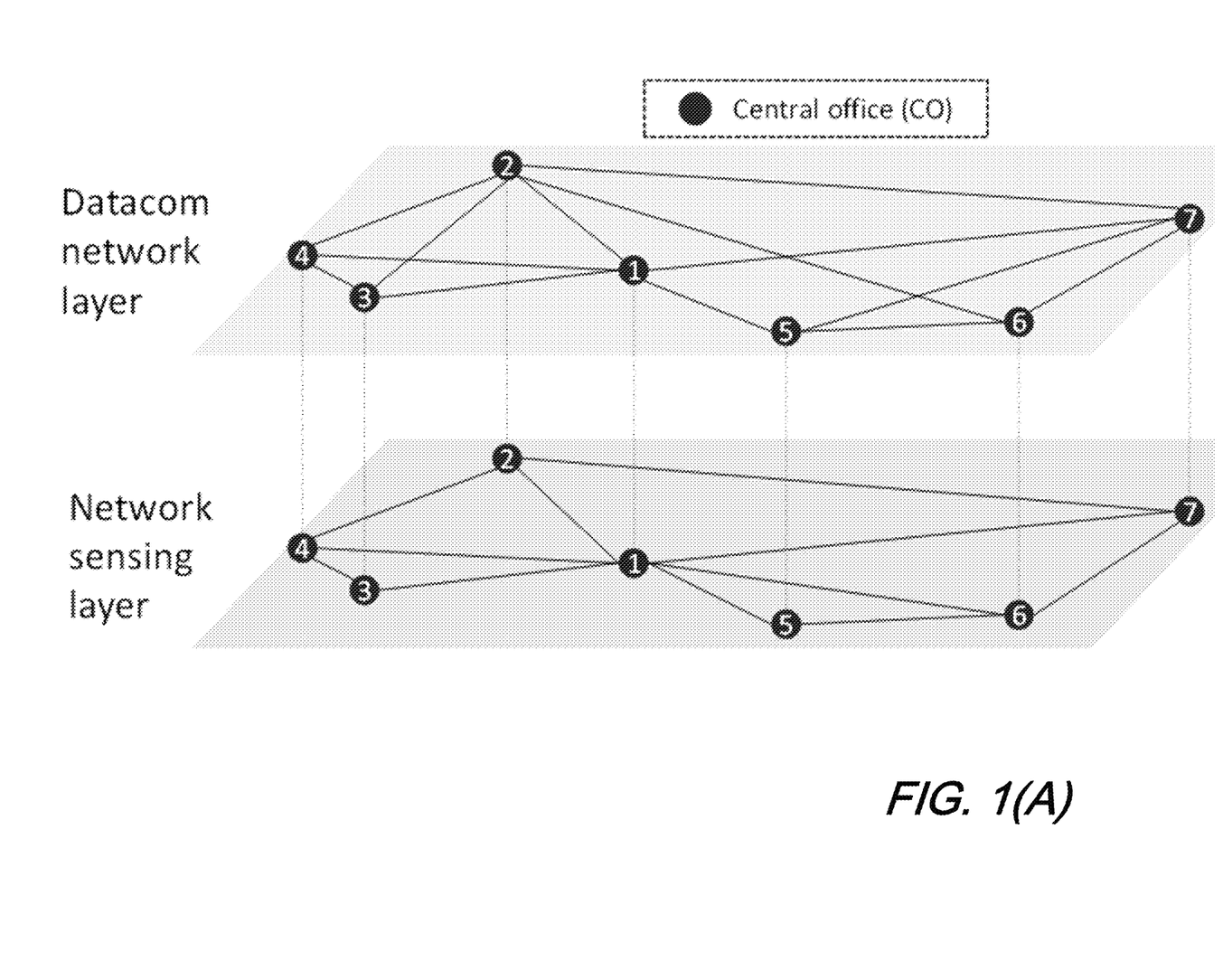
FIG. 1(A) is a schematic diagram illustrating a network sensing layer overlaid on an existing data communications network according to aspects of the present disclosure.

FIG. 1(A) is a schematic diagram illustrating a network sensing layer overlaid on an existing data communications network according to aspects of the present disclosure. As may be observed from that figure, each individual node shown in the network may be a central office, including—for example—an optical switch for optically interconnecting optical fiber facilities comprising the network. When so constructed, a network sensing layer may be viewed of as overlaid on the data communications/telecommunications network.

Figure 1B:
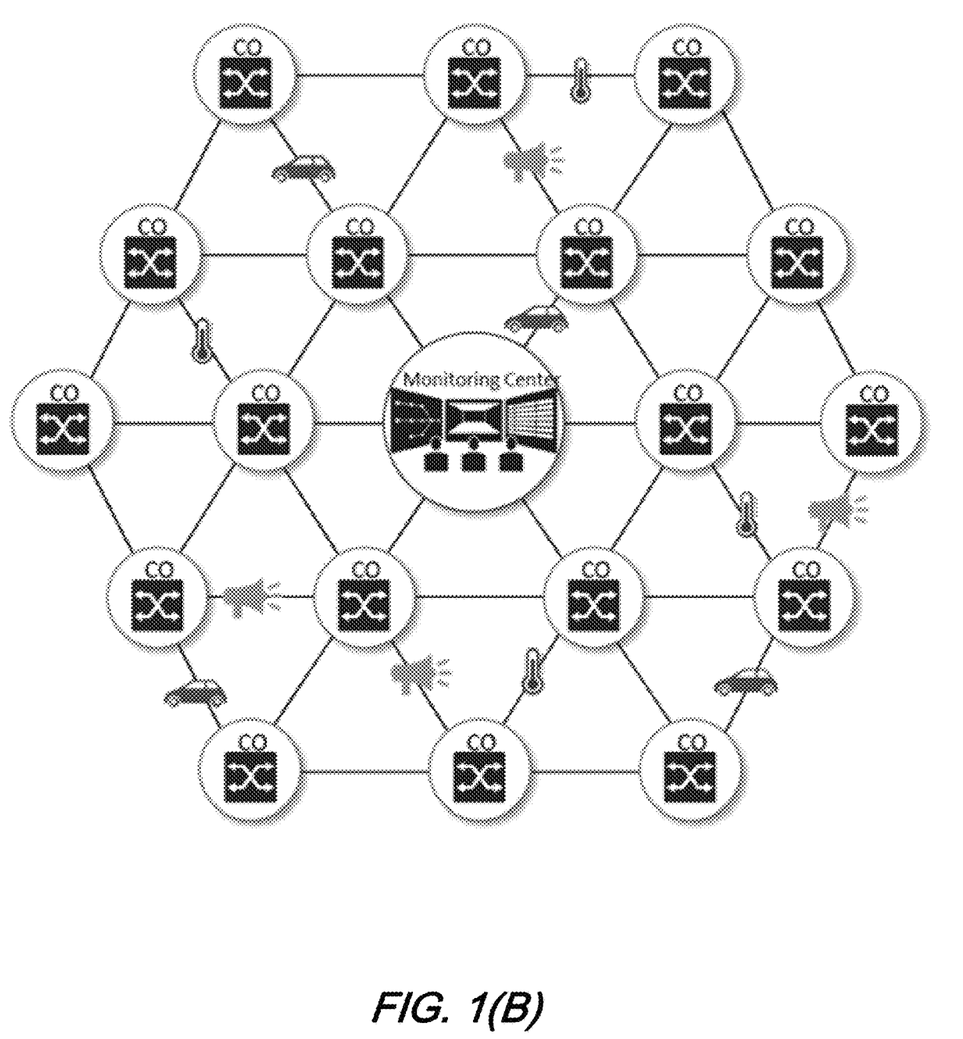
FIG. 1(B) is a schematic diagram illustrating a network sensing layout comprising a network of interconnected optical switches according to aspects of the present disclosure.

FIG. 1(B) is a schematic diagram illustrating a network sensing layout comprising a network of interconnected optical (photonic) switches according to aspects of the present disclosure. As may be appreciated, such network is interconnected such that there exists one or more paths between any two nodes. As a result of the switches employed, the interconnect need not be a direct connection therebetween. More particularly, a "via" or intermediary switch(es) may exist along the path between two switches.

As may be readily appreciated by those skilled in the art, when a network is so configures, any of a number of possible topologies is possible including a bus, ring, star, or mesh (network). Using existing network infrastructure in these networks, network sensing is achieved by DFOS system using dark fibers or live, operational fibers (or combinations thereof) that carry high speed telecommunications data. Hence, the entire telecommunications network is in effect a sensing media as a network sensor for vibration, temperature, and acoustic detection. When outfitted with supplemental sensors that effect the vibration, temperature, and/or acoustic methods—additional sensor modalities—i.e., chemical—may be likewise achieved.

Figure 2:
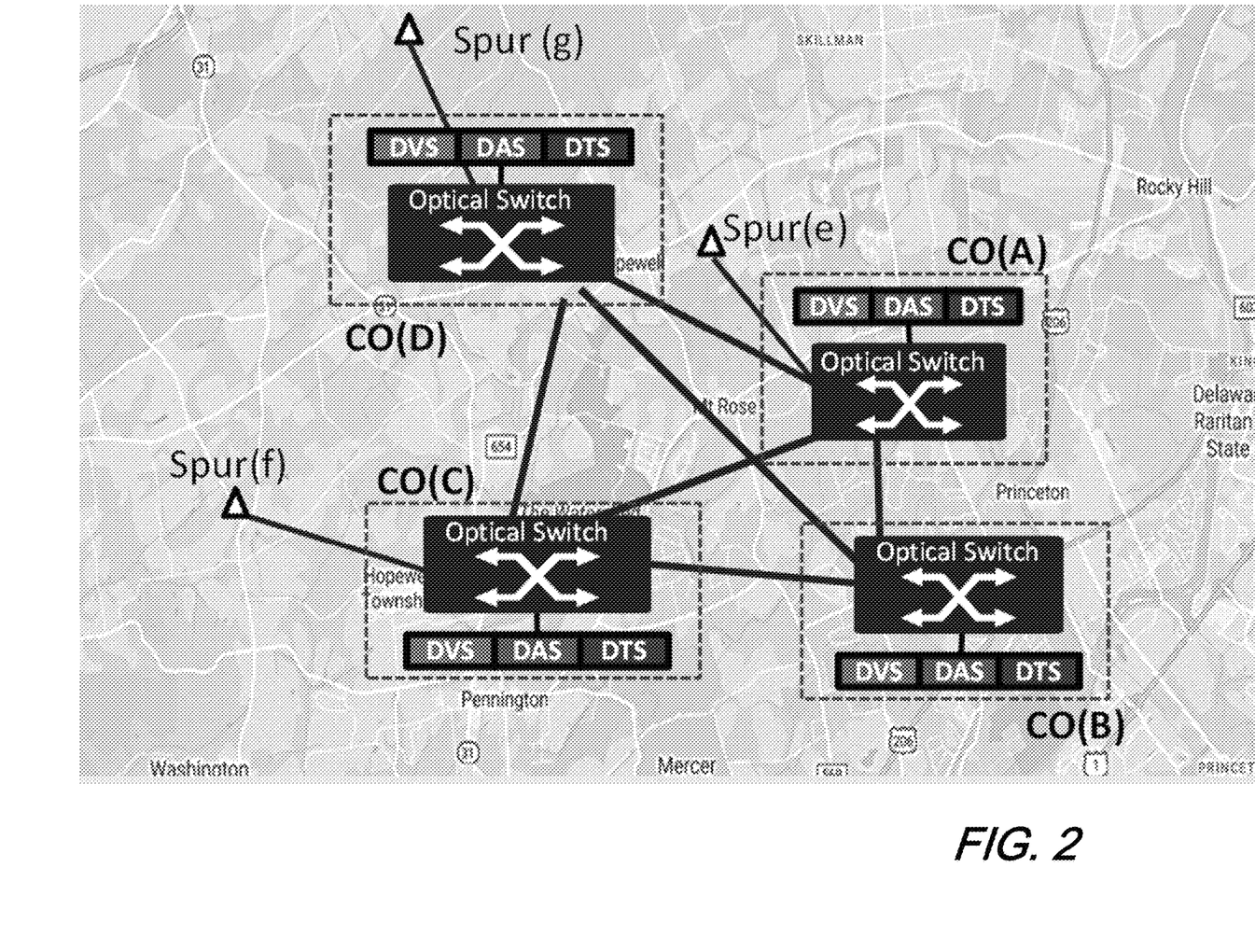
FIG. 2 is a schematic diagram illustrating a distributed sensor network testbed over an existing communications network with topological optical fiber connections according to aspects of the present disclosure.

FIG. 2 is a schematic diagram illustrating a distributed sensor network testbed over an existing communications network with topological optical fiber connections according to aspects of the present disclosure.

We note that such testbed is an actual layout for a field test of deployed optical fiber cable links which comprise fiber routes between central offices (CO) and branches. As may be observed, the testbed network includes four COs (CO(A), CO(B), CO(C) and CO(D)) and three spur routes (Spur(e), Spur(f), and Spur(g)) with section length of 4.5 km-17.2 km. The optical fiber used is located inside a cable either buried underground or suspended/hanging on utility poles. The DFOS technologies used in this testbed are distributed vibration/acoustic/temperature sensing (DVS/DAS/DTS).

Photonic switches (SW) having switching time(s)<10 ms are employed in the COs to such that it is possible to realize ring, mesh, star or other topologies of fiber links. For example, a ring network is achieved from CO(A)-CO(D)-CO(C)-CO(A), while fiber spur(g) is carrying from CO(A)-CO(D)-Spur(g) by the SW in CO(D). We note that DFOS systems can advantageously be located at any CO as needed to detect multiple environmental features which are appropriate for particular applications, such as that for smart cities/communities.

Figure 3A:
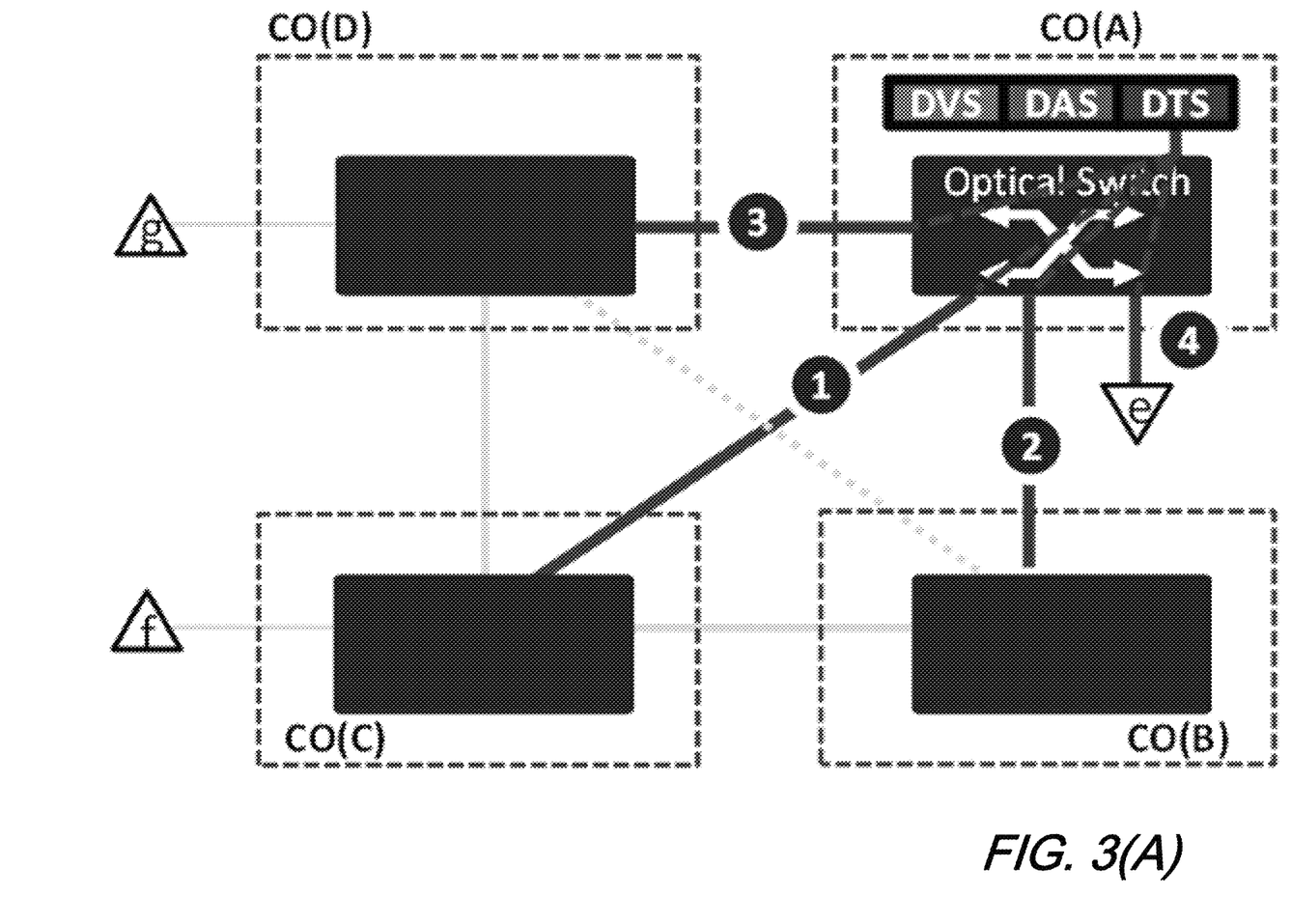
Figure 3B:
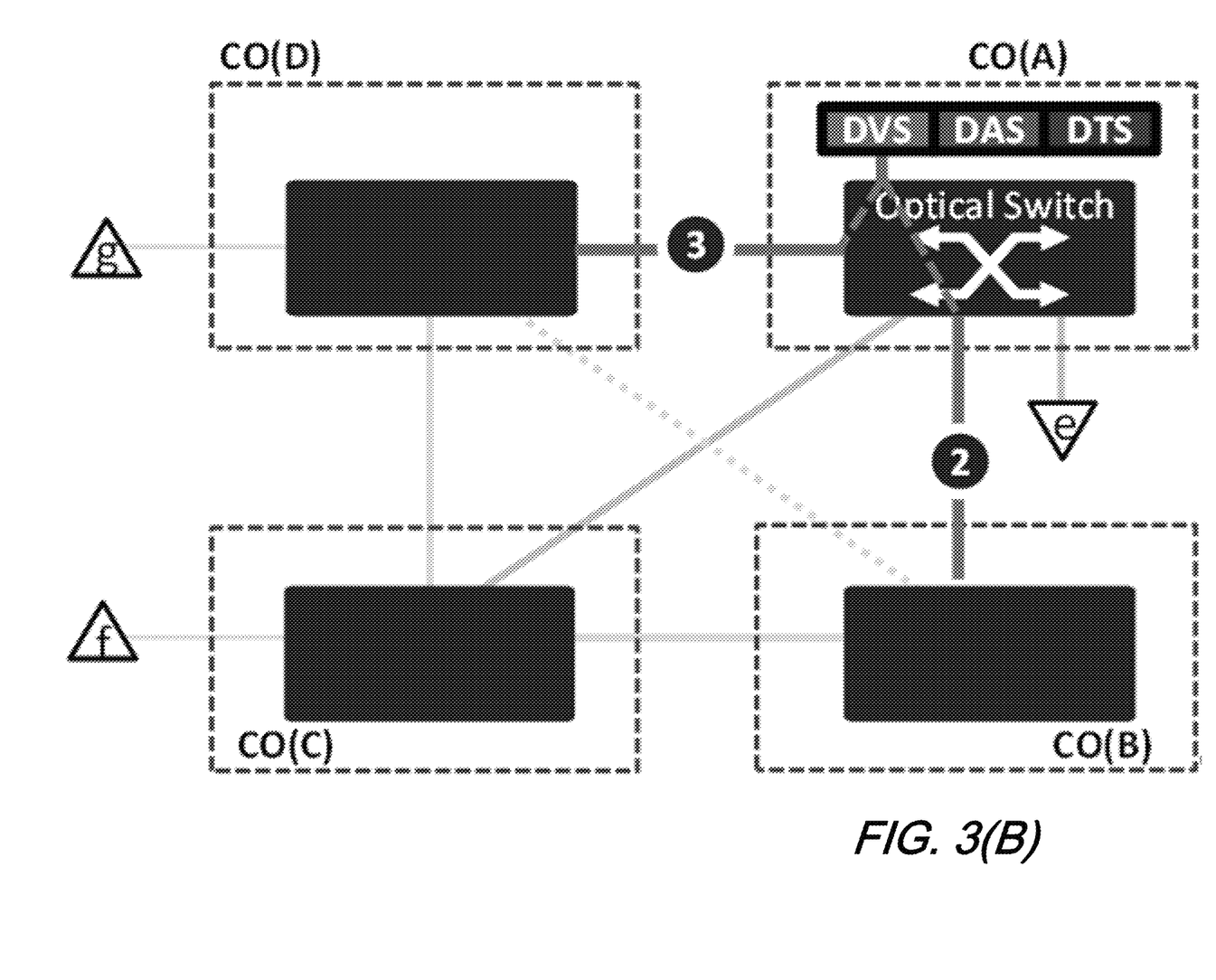

FIG. 3(A) and FIG. 3(B) are schematic diagrams showing an illustrative star network topology for: FIG. 3(A)—distributed temperature sensing (DTS); and FIG. 3(B)—distributed vibration sensing (DVS) according to aspects of the present disclosure.

With reference to those figures, it may be observed that the DFOS system is setup/configured in a star topology that detects environmental temperatures by DTS, as illustratively shown in FIG. 3(A) and DVS as illustratively shown in FIG. 3(B). To realize/configure a star network, the SW in CO(A) was used to switch sensing paths (A)-(C), (A)-(B), (A)-(D) and (A)-(e) to detect temperatures of route 1-4.

Figure 4A:
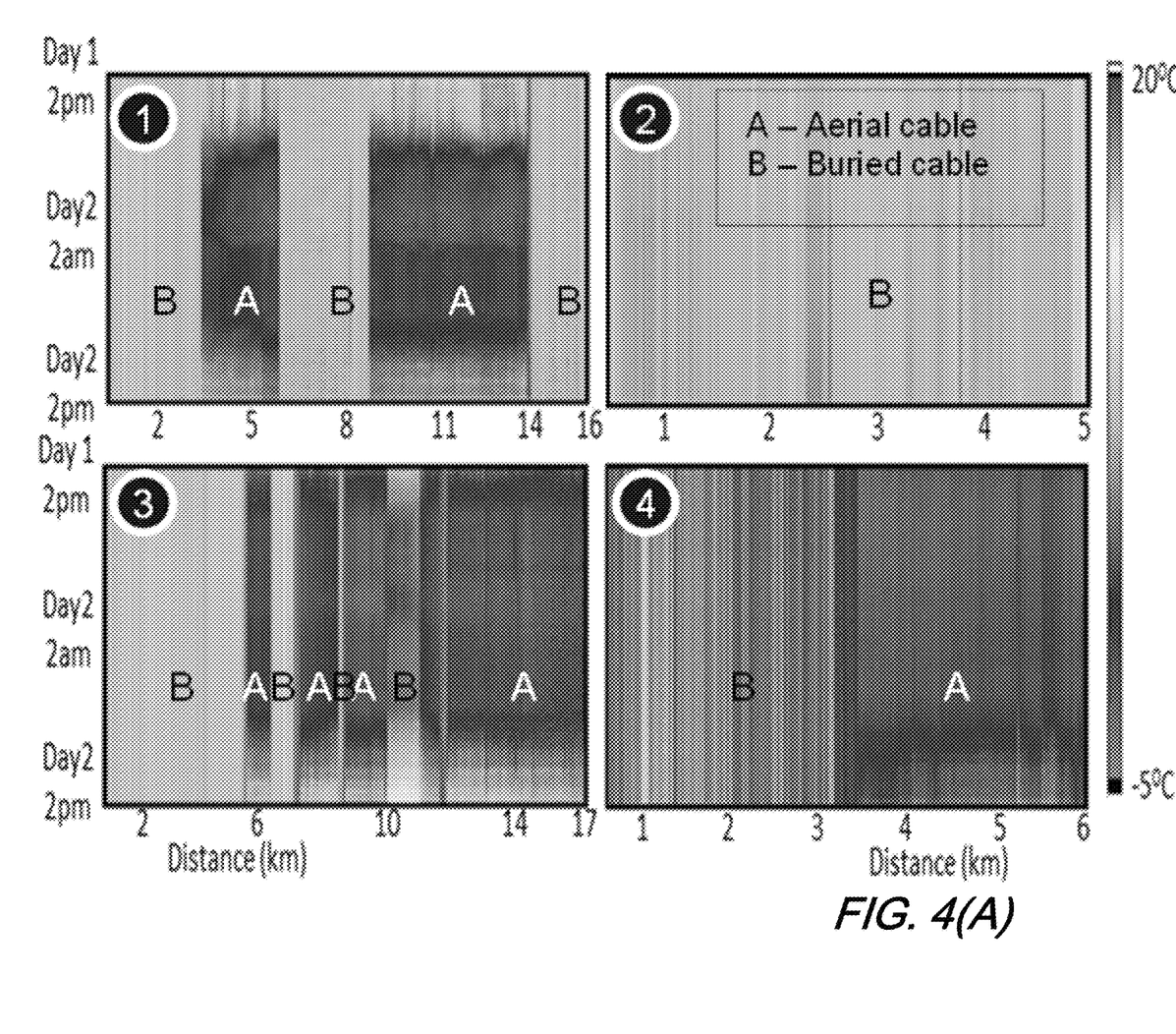
FIG. 4(A) and FIG. 4(B) are plots showing an illustrative environmental temperature detection for a ring network topology for different days and different fiber length, according to aspects of the present disclosure.
Figure 4B:
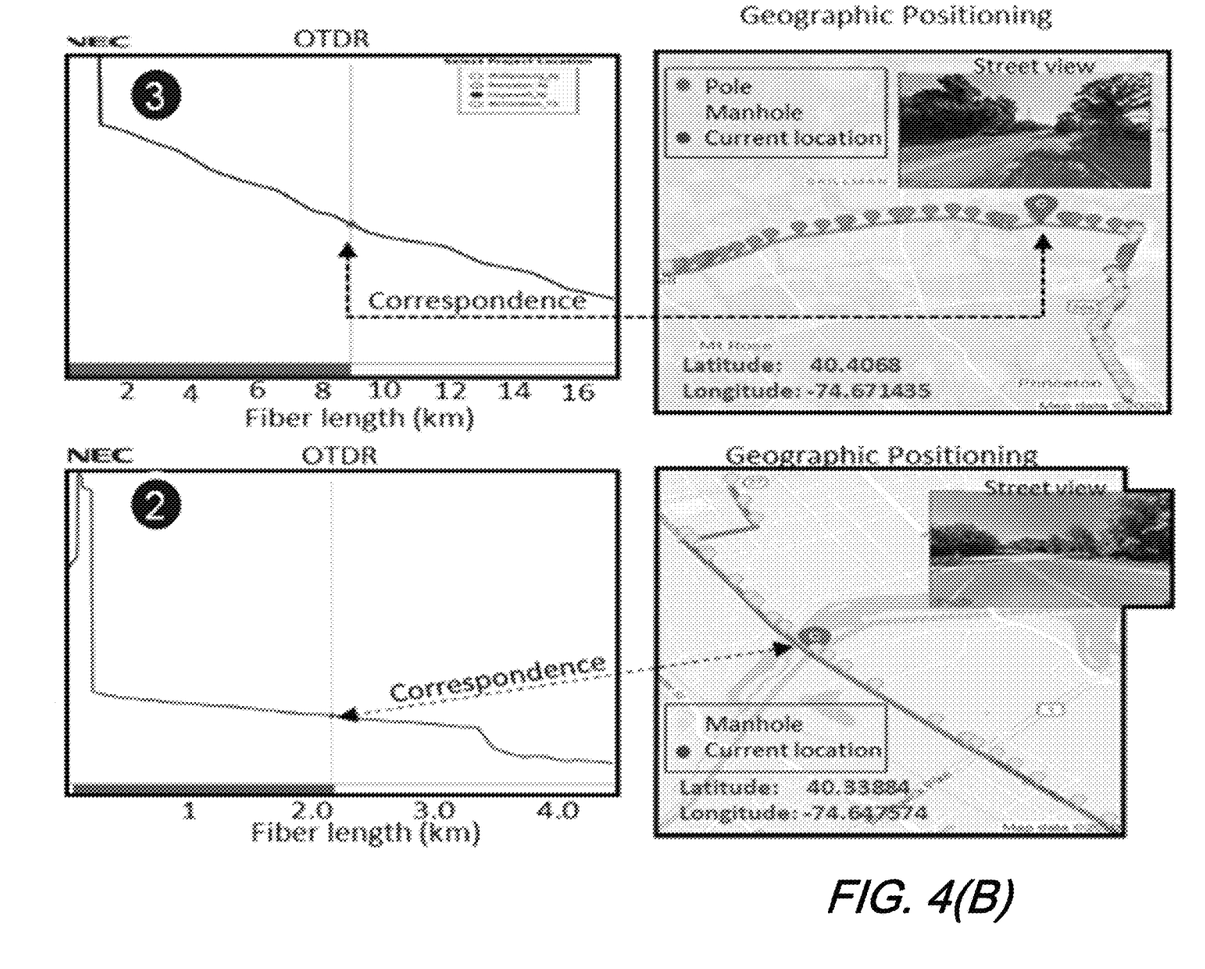

FIG. 4(A) and FIG. 4(B) are plots showing two illustrative environmental sensing applications on a ring network topology. Continuous 24-hour temperature measurement for four routes is shown in FIG. 4(A). It is clear to distinguish locations of the cable as hanging on utility poles or buried underground. Section "A" in FIG. 4(A) represent aerial cables based on large day and night temperature difference. For underground cables, the temperature is more stable as sections "B". Especially for route 2, the entire length of optical fiber cable is buried underground.

We note that an average underground temperature in mid-February is 10° C. and ~0° C. for ambient during midnight. With our proposed architecture, more localized temperature information can be provided by existing fiber infrastructures.

Figure 5:
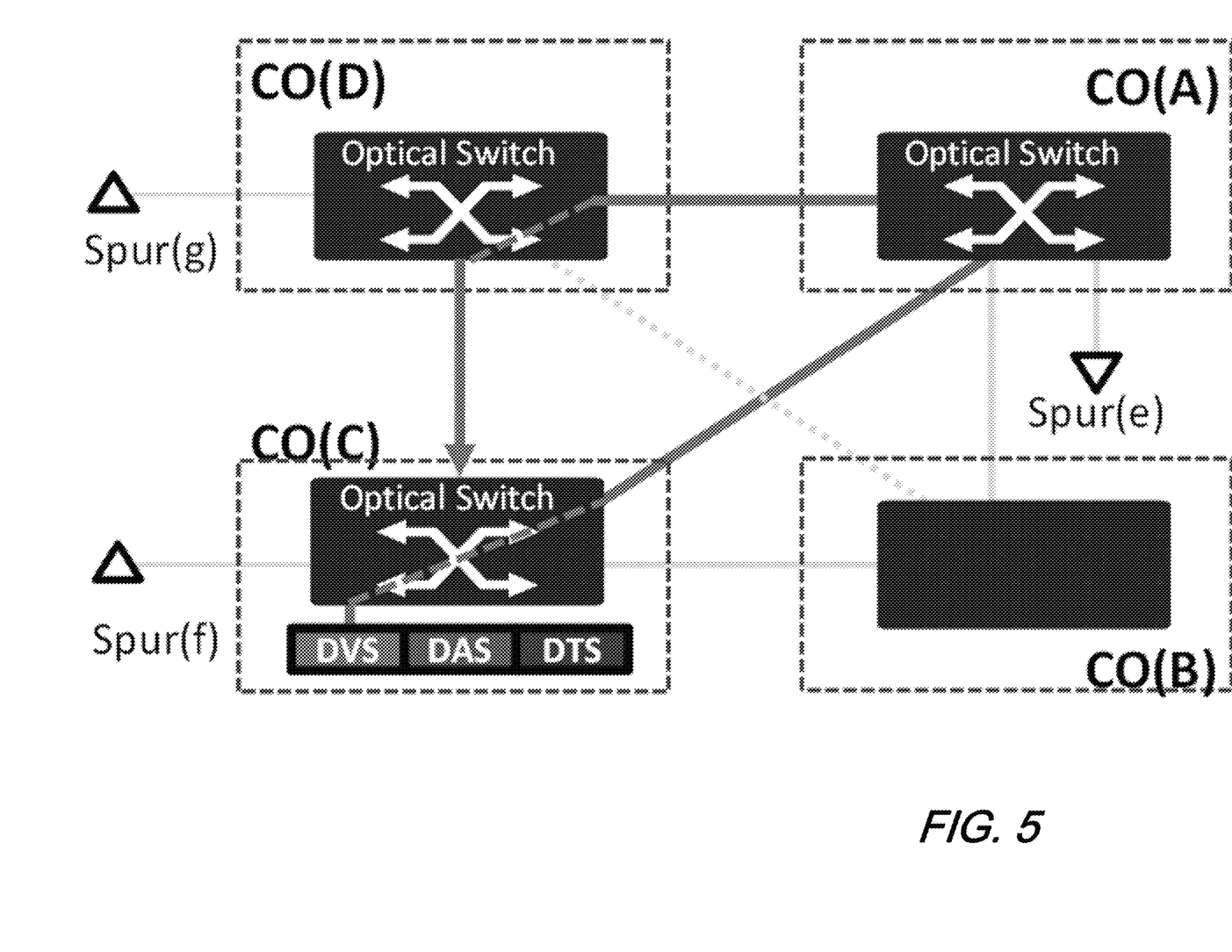
FIG. 5 is a schematic diagram showing an illustrative ring sensor network topology according to aspects of the present disclosure.

FIG. 4(B) shows two OTDR curves and mapping of OTDR distances to a geographic location on a map with latitude and longitude information. As an example of route 3, if operators would like to check the fiber cable at a distance of 9 km, the GUI shows the corresponding geographic location on the map with street view functions. This will help operators to locate the cable efficiently FIG. 5 is a schematic diagram showing an illustrative ring sensor network topology according to aspects of the present disclosure. Such network is arranged in a ring topology and utilizes DVS to detect vehicle traffic. To achieve a ring topology, sensing signals were directed over optical paths from (C)-(A)-(D)-(C) by SWs.

Figure 6:
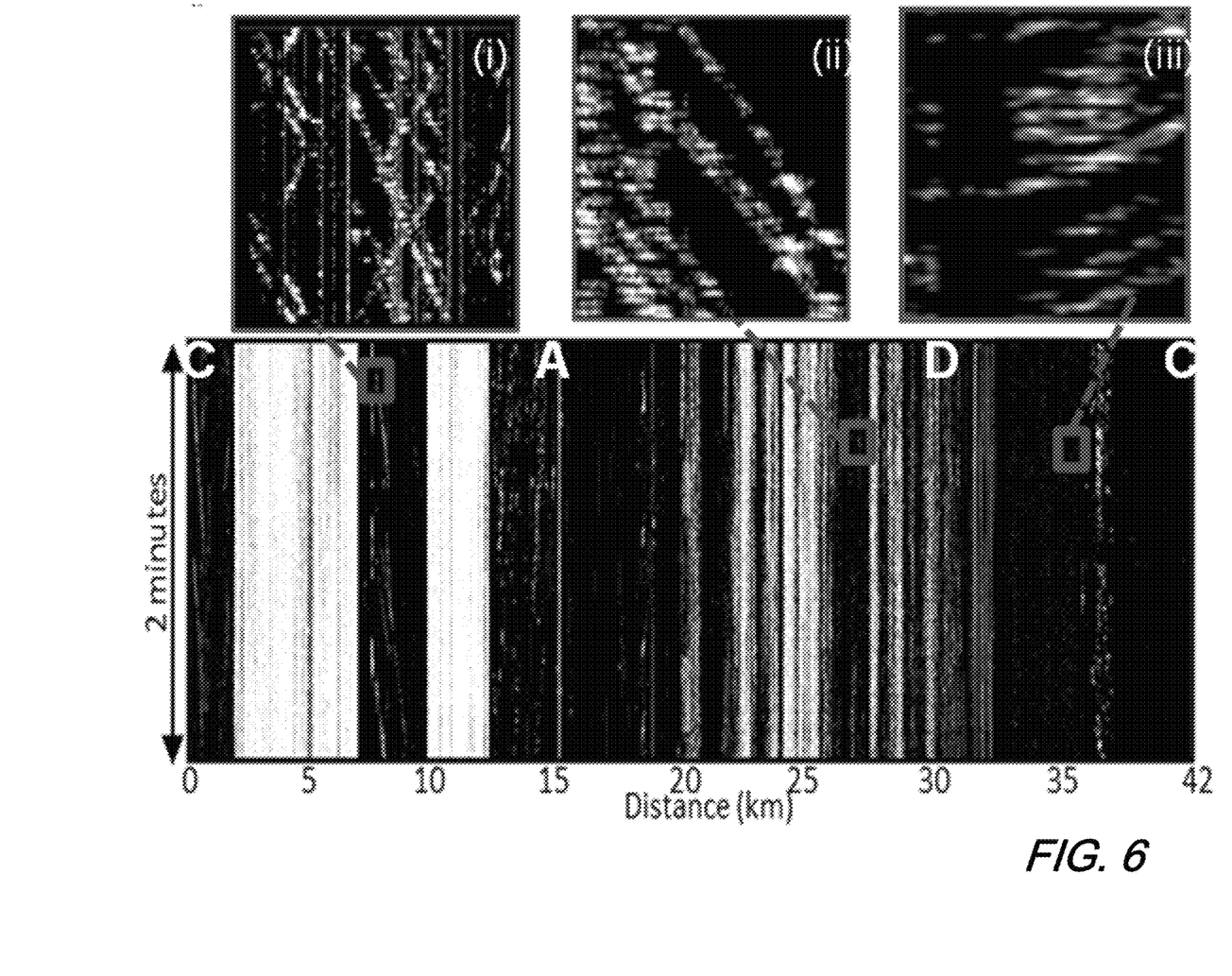
FIG. 6 shows a series of waterfall plots captured from DVS system illustrating vehicle traffic detection from an DFOS network exhibiting a ring topology according to aspects of the present disclosure.

FIG. 6 shows a series of waterfall plots captured from DVS system illustrating vehicle traffic detection from an DFOS network exhibiting a ring topology according to aspects of the present disclosure.

We note that such "waterfall" trace is captured from DVS system showing the ambient vibration intensity in a 2-minute window (vertical axis) and location (horizontal axis), with 42 km total distance of a ring network. A few vertical sections with high intensity signals represent aerial cables and low intensity areas express buried cables. It was resulted from vibrations generated by wind on aerial cables. In order to see vehicle traffic patterns, the enlarged waterfall traces are inserted in (i)-(iii).

Figure 7:
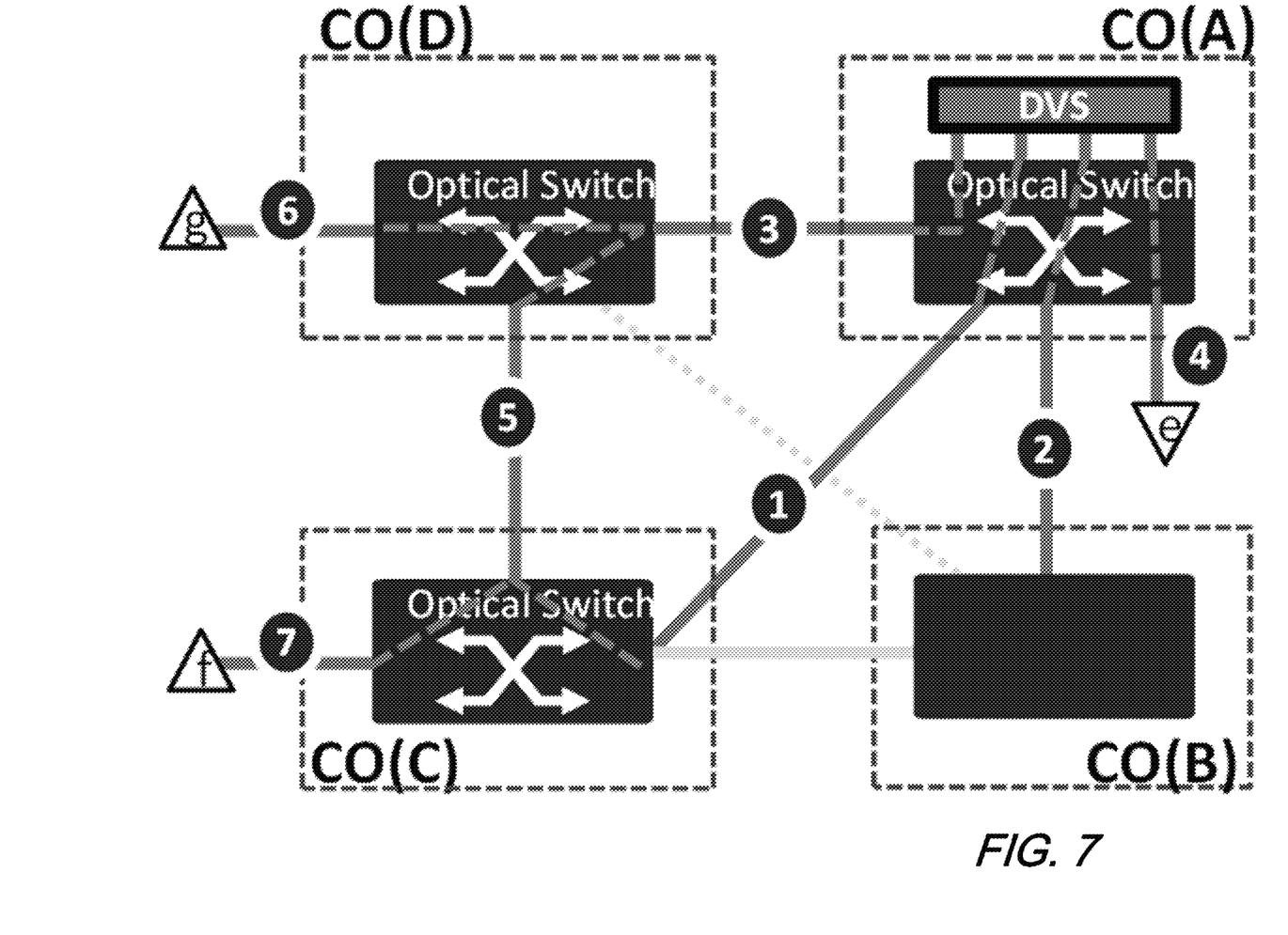
FIG. 7 is a schematic diagram illustrating a meshed sensor network topology according to aspects of the present disclosure.

FIG. 7 is a schematic diagram illustrating a meshed sensor network topology according to aspects of the present disclosure. As shown therein, a 4-channel DVS system in a semi-meshed sensor topology is used to detect environmental vibrations. To realize such a meshed network, SW in different COs was used in route switching to achieve route 1-7. As an example, it was switched to (A)-(D)-(g) to obtain route 6, and to (A)-(D)-(C) to achieve route 5.

Figure 8A:
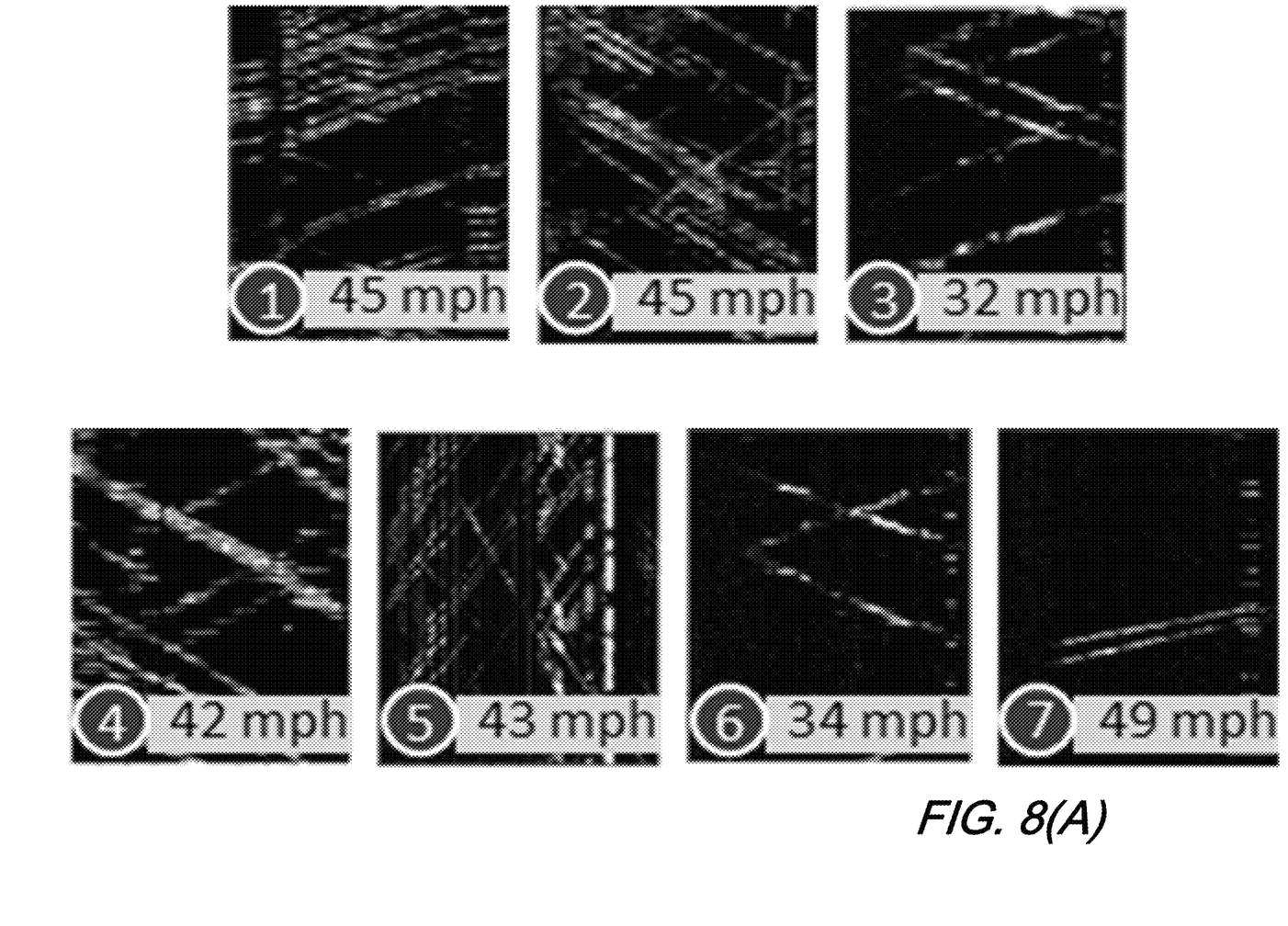
FIG. 8(A) is a series of waterfall plots in a selected 1-km window for 7 routes for vehicle traffic detected with a meshed topology.
Figure 8B:
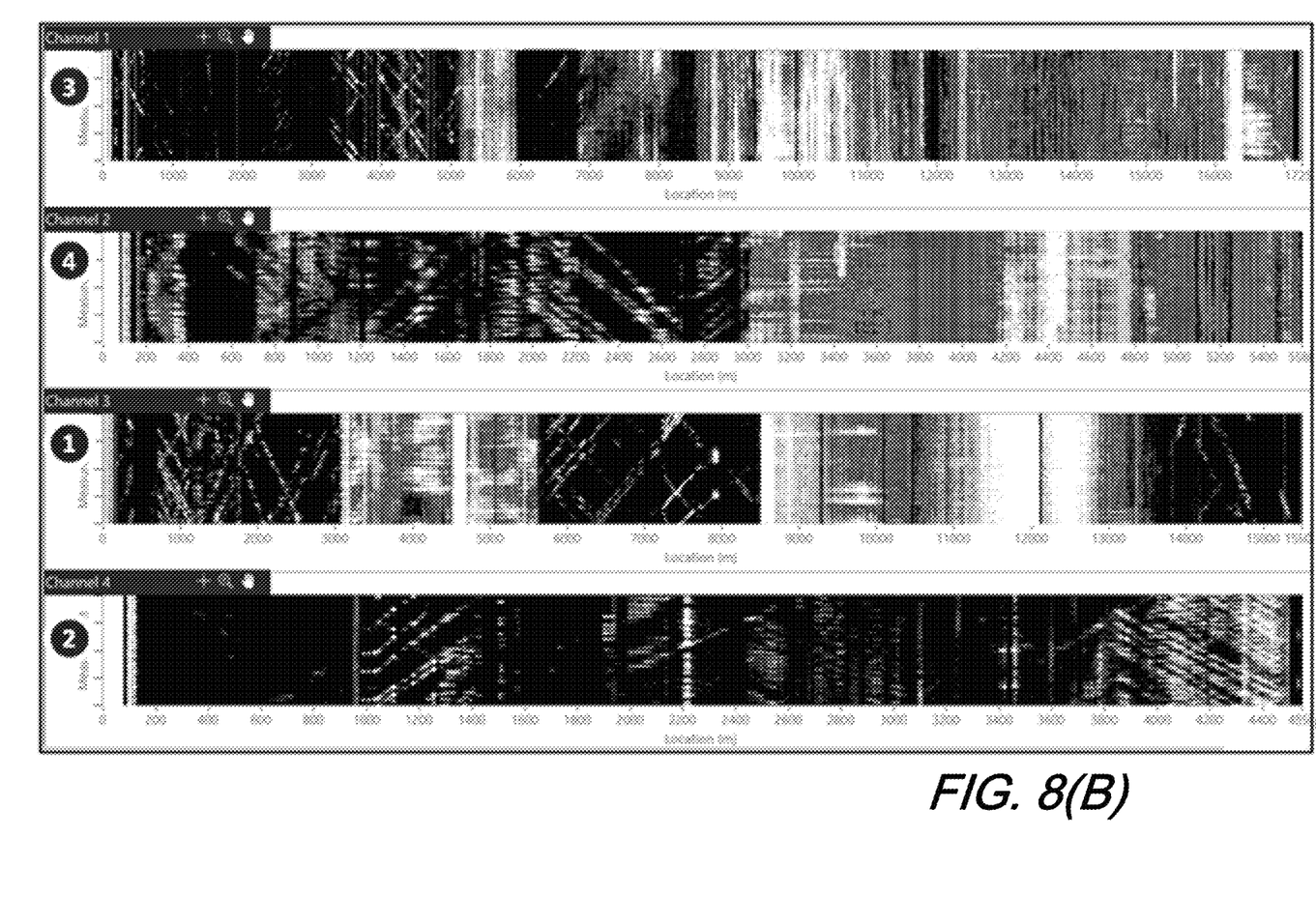
FIG. 8(B) is a series of plots for routes 1 to 4 wherein fiber routes are sensed simultaneously with a 4-channel DVS according to aspects of the present disclosure.

FIG. 8(A) is a series of waterfall plots in a selected 1-km window for 7 routes for vehicle traffic detected with a meshed topology; and FIG. 8(B) is a series of plots for routes 1 to 4 wherein fiber routes are sensed simultaneously with a 4-channel DVS according to aspects of the present disclosure.

As noted, FIG. 8(A) shows waterfall traces in a selected 1-km window for 7 routes wherein the traffic patterns are in 2 minute intervals and are shown with an average vehicle speed. Advantageously, we have newly developed a 4-channel DVS that monitors multiple fiber routes monitoring simultaneously. FIG. 8(B) exhibits the result for route 1 to 4 as an example in a time window of 4 minutes.

Figure 9:
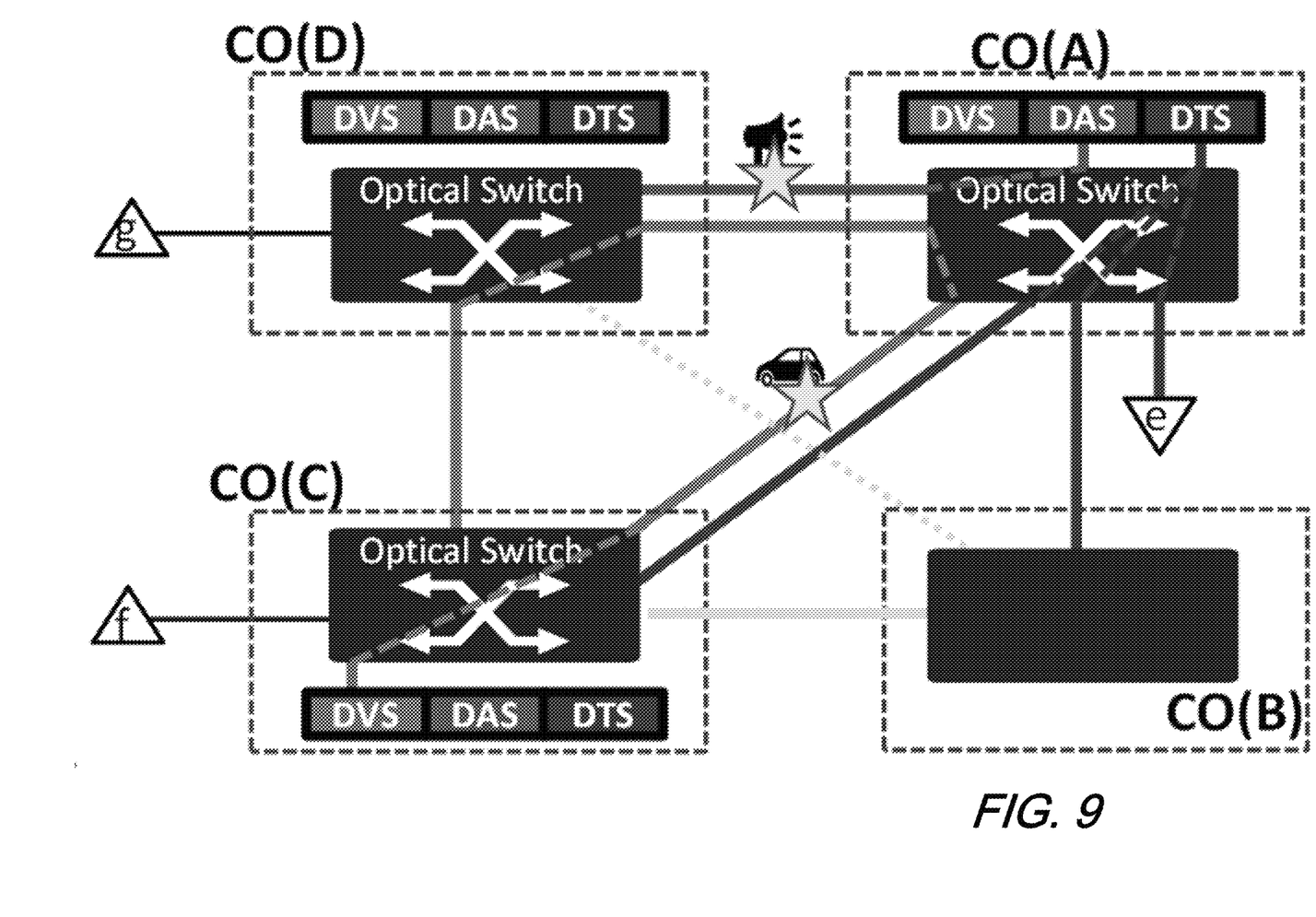
FIG. 9 is a schematic diagram of a flexible sensor network topology according to aspects of the present disclosure.

FIG. 9 is a schematic diagram of a flexible sensor network topology according to aspects of the present disclosure. As shown in that figure, there exist three different paths for acoustic, vibration and temperature sensing, respectively. In this flexible network, DFOS systems can be located in every CO; hence, every location within the network with any environmental effects can be detected.

Figure 10A:
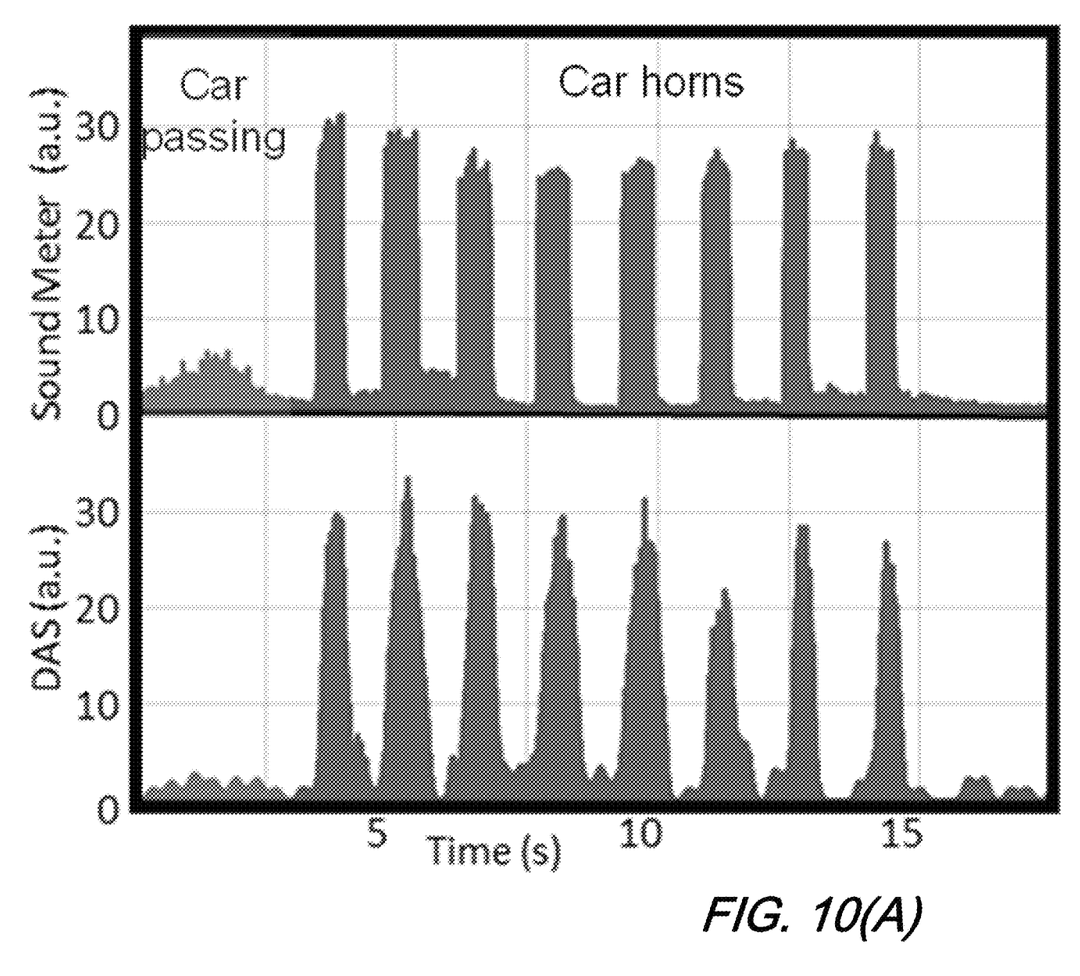
FIG. 10(A) is a plot of acoustic effects including a car passing by and a car horn collected via distributed acoustic sensing.
Figure 10B:
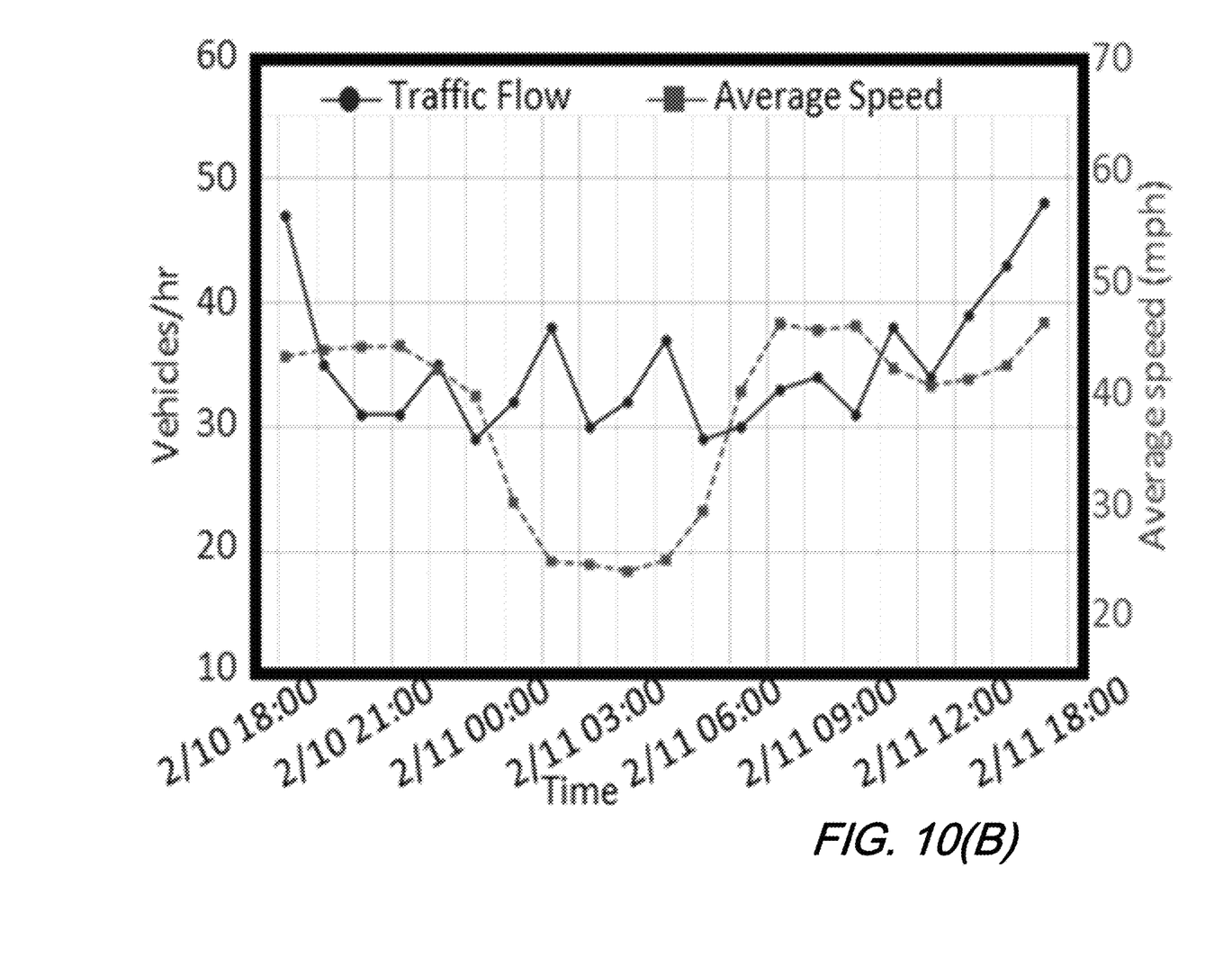
FIG. 10(B) is a plot showing traffic monitoring in a flexible sensor network according to aspects of the present disclosure.

FIG. 10(A) is a plot of acoustic effects including a car passing by and a car horn collected via distributed acoustic sensing; and FIG. 10(B) is a plot showing traffic monitoring in a flexible sensor network according to aspects of the present disclosure.

With respect to these figures, we note that both car horn and traffic monitoring in different route is illustrated. FIG. 10(A) shows received field acoustic effects from passing vehicles and 8 consecutive car horns. The upper plot is produced by amplitude detection by a commercial sound meter and received signals by a DAS system through the down-lead fiber on a pole is shown in lower plot. It can be seen that the sensing system is capable to catch and playback the sound events in the field which is suitable for safer city applications. FIG. 10(B) illustrates a 24-hour traffic monitoring plot that results from vehicle accounting and average speed estimation. The selected section is on a major road from northwest to the campus of a major university.

At this point, while we have presented this disclosure using some specific examples, those skilled in the art will recognize that our teachings are not so limited. Accordingly, this disclosure should only be limited by the scope of the claims attached hereto.

The invention claimed is:

1. A distributed fiber optic sensing (DFOS) system comprising:
   an optical network including a plurality of optical switches, each individual one of the optical switches optically interconnected to one or more other one(s) of the plurality by at least one length of optical fiber cable;
   a DFOS interrogator system in optical communication with at least one of the plurality of optical switches by a length of optical fiber cable;
   an intelligent analyzer configured to analyze DFOS sensing data received by the DFOS interrogator system;
   the distributed fiber optic sensing system CHARACTERIZED IN THAT
      at least a portion of the optical network is an overlay network of an optical telecommunications network;
      the optical network exhibits a topology selected from the group consisting of star topology, ring topology, mesh topology, and flexible topology;
      the optical network is reconfigurable from one topology to another topology; and
      distributed fiber optic sensing data and telecommunications data coexist simultaneously on one or more lengths of the optical fiber.

2. A distributed fiber optic sensing (DFOS) system comprising:
   an optical network including a plurality of optical switches, each individual one of the optical switches optically interconnected to one or more other one(s) of the plurality by at least one length of optical fiber cable;
   a DFOS interrogator system in optical communication with at least one of the plurality of optical switches by a length of optical fiber cable;
   an intelligent analyzer configured to analyze DFOS sensing data received by the DFOS interrogator system;
   the distributed fiber optic sensing system CHARACTERIZED IN THAT
      at least a portion of the optical network is an overlay network of an optical telecommunications network;
      the optical network exhibits a topology selected from the group consisting of star topology, ring topology, mesh topology, and flexible topology;
      the optical network is reconfigurable from one topology to another topology;
      distributed fiber optic sensing data and telecommunications data coexist simultaneously on one or more lengths of the optical fiber; and
      the DFOS data is one or more selected from the group consisting of distributed vibration sensing, distributed temperature sensing, distributed vibration/acoustic sensing.

3. A distributed fiber optic sensing (DFOS) system comprising:
   an optical network including a plurality of optical switches, each individual one of the optical switches optically interconnected to one or more other one(s) of the plurality by at least one length of optical fiber cable;
   a DFOS interrogator system in optical communication with at least one of the plurality of optical switches by a length of optical fiber cable;
   an intelligent analyzer configured to analyze DFOS sensing data received by the DFOS interrogator system;

the distributed fiber optic sensing system CHARACTERIZED IN THAT
- at least a portion of the optical network is an overlay network of an optical telecommunications network;
- the optical network exhibits a topology selected from the group consisting of star topology, ring topology, mesh topology, and flexible topology;
- the optical network is reconfigurable from one topology to another topology;
- distributed fiber optic sensing data and telecommunications data coexist simultaneously on one or more lengths of the optical fiber;
- the DFOS data is one or more selected from the group consisting of distributed vibration sensing, distributed temperature sensing, distributed vibration/acoustic sensing; and
- the optical network topology is configured by selective operation of one or more of the optical switches.

4. The DFOS system of claim 3 FURTHER CHARACTERIZED IN THAT the optical network topology is reconfigurable in real-time.

5. The DFOS system of claim 4 FURTHER CHARACTERIZED IN THAT a portion of the optical network used for distributed sensing is in one topology and another portion of the optical network used for distributed sensing is in another, different topology.

* * * * *